(12) United States Patent
Tseng

(10) Patent No.: US 10,274,655 B2
(45) Date of Patent: Apr. 30, 2019

(54) COLOR FILTER AND DISPLAY PANEL USING SAME

(71) Applicant: HON HAI PRECISION INDUSTRY CO., LTD., New Taipei (TW)

(72) Inventor: Shih-Pin Tseng, Hsinchu (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 796 days.

(21) Appl. No.: 14/575,617

(22) Filed: Dec. 18, 2014

(65) Prior Publication Data

US 2016/0093677 A1 Mar. 31, 2016

(30) Foreign Application Priority Data

Sep. 30, 2014 (TW) .............................. 103134114 A

(51) Int. Cl.
*G02B 5/22* (2006.01)
*G02B 5/20* (2006.01)

(52) U.S. Cl.
CPC ............... *G02B 5/22* (2013.01); *G02B 5/201* (2013.01); *G02B 5/206* (2013.01)

(58) Field of Classification Search
CPC .......... G02B 5/22; G02B 5/201; G02B 5/206; H01L 27/322; F21K 9/56; F21V 9/16
USPC ............................................ 362/84; 359/891
See application file for complete search history.

(56) References Cited

U.S. PATENT DOCUMENTS

| 2007/0035237 A1* | 2/2007 | Lee | H01L 27/322 313/504 |
| 2010/0052504 A1* | 3/2010 | Sato | C09K 11/02 313/483 |
| 2011/0089809 A1 | 4/2011 | Noh | |
| 2012/0287381 A1* | 11/2012 | Li | G02F 1/133617 349/106 |
| 2013/0154478 A1* | 6/2013 | Ohe | H01L 27/322 315/85 |
| 2014/0192294 A1* | 7/2014 | Chen | F21V 9/08 349/69 |

FOREIGN PATENT DOCUMENTS

| CN | 102044552 A | 5/2011 |
| CN | 103278876 A | 9/2013 |
| CN | 203465442 U | 3/2014 |
| CN | 203658706 U | 6/2014 |

* cited by examiner

*Primary Examiner* — Anh T Mai
*Assistant Examiner* — Meghan K Ulanday
(74) *Attorney, Agent, or Firm* — ScienBiziP, P.C.

(57) ABSTRACT

A color filter includes a first filtering part and a number of first quantum dot particles formed in the first filtering part. A color of the first filtering part is a first primary color. The first quantum dot particles convert a light having a wavelength less than a wavelength of the first primary color to a light with the first primary color.

6 Claims, 9 Drawing Sheets

COLOR FILTER AND DISPLAY PANEL USING SAME

FIELD

The disclosure generally relates to color filter and display panel technologies.

BACKGROUND

A color filter usually only lets a light with a specific color through and absorbs the light of the other colors. Thus, a light transmittance of the color filter is low and a lot of backlight is wasted after passing through the color filter.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
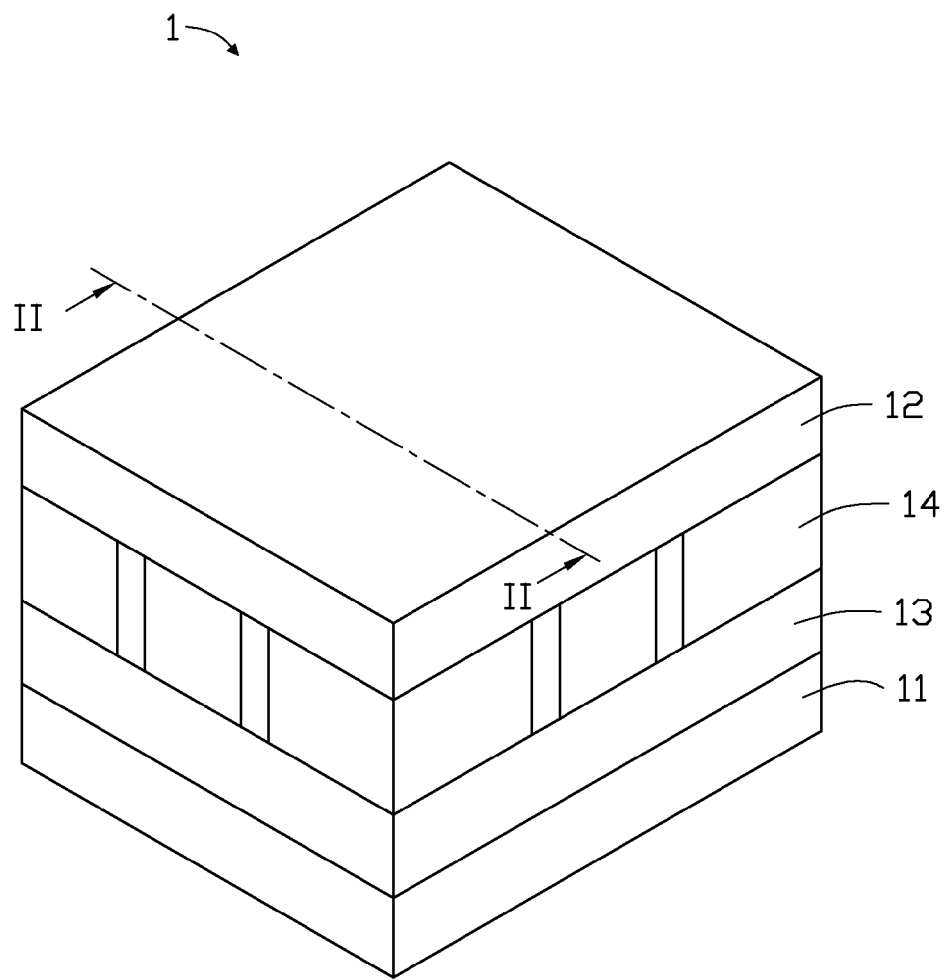
FIG. 1 is an isometric view of a first embodiment of a display panel.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

Figure 2:
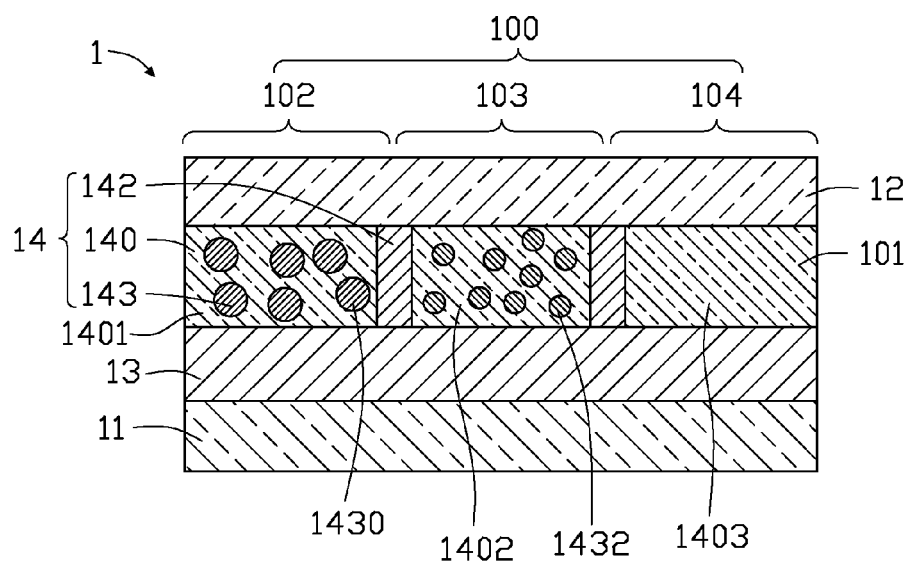
FIG. 2 is a cross-sectional view of the display panel of FIG. 1, taken along line II-II.

FIG. 1 illustrates an isometric view of a first embodiment of a display panel 1. FIG. 2 illustrates a cross-sectional view of the display panel 1 of FIG. 1, taken along line II-II. FIG. 2 illustrates one pixel area 100 for example. The display panel 1 displays a full color image. The display panel 1 can be a liquid crystal display (LCD) panel or an organic light emitting diode (OLED) display panel. In this embodiment, the display panel 1 is an OLED display panel.

The display panel 1 includes a first substrate 11, a second substrate 12 opposite to the first substrate 11, a lighting device 13, and a color filter 14.

The lighting device 13 is formed on the first substrate 11 and configured to emit a backlight. In this embodiment, the lighting device 13 is an OLED array substrate. The OLED array substrate includes a number of thin film transistors (not shown) to control a number of OLEDS to emit a white backlight.

The color filter 14 is formed on the second substrate 12. The color filter 14 receives the backlight from the lighting device 13 and converts the backlight to light with different colors for displaying a full color image. The color filter 14 defines a number of pixel areas 100. Each pixel area 100 includes a number of sub-pixels 101 for respectively converting the backlight to the light with different colors. In this embodiment, the display panel 1 employs three-primary color lights to display the full color image. The sub-pixels 101 can be a first sub-pixel 102, a second sub-pixel 103, and a third sub-pixel 104. The first sub-pixel 102 emits a red light. The second sub-pixel 103 emits a green light. The third sub-pixel 104 emits a blue light. In the other embodiment, the color filter 14 can be formed on the lighting device 13 of the first substrate 11.

The color filter 14 includes a number of filtering parts 140 with different colors, a black matrix 142, and a number of quantum dot particles 143 formed in the filtering parts 140. The filtering parts 140 with different colors are divided by the black matrix 142 and respectively correspond to the sub-pixels 101 for respectively converting the backlight to light with different colors.

The filtering parts 140 are made of photoresist material and include dye with a color corresponding to the color of converted light. The bases 140 can be formed on the second substrate 12 by a photolithography process, an ink jet printing process, a microtransfer process, or a silk screen printing process.

Figure 3:
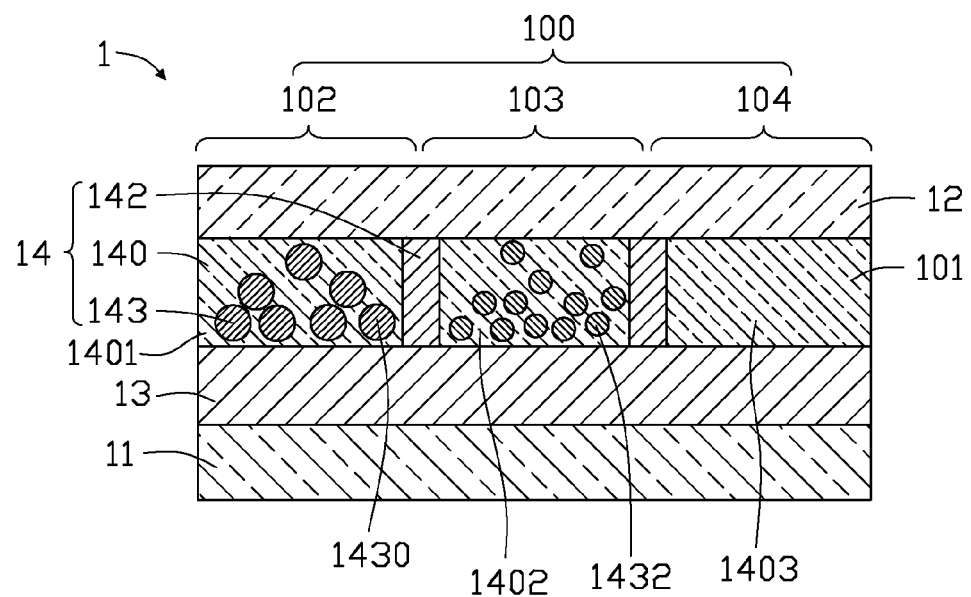
FIG. 3 is similar to FIG. 2, but showing a varying density distribution of a number of quantum dot particles in a color filter of the display panel of FIG. 1.

The quantum dot particles 143 are made of an inorganic nano-material which can convert the backlight having a wavelength less than a wavelength of a light with a specific color to the light with the specific color. In this embodiment, the quantum dot particles 143 includes a number of red quantum dot particles 1430 and a number of green quantum dot particles 1432. The red quantum dot particles 1430 converts the light having a wavelength less than a wavelength of red light to the red light. The green quantum dot particles 1432 converts the light having a wavelength less than a wavelength of green light to the green light. In this embodiment, the quantum dot particles 143 are evenly formed in the filtering parts 140. In the other embodiment, a density of the quantum dot particles 143 is varied in different portions of the filtering parts 140. For example, referring to FIG. 3, a density of the quantum dot particles 143 near the lighting device 13 is greater than a density of the quantum dot particles 143 away from the lighting device 13.

In this embodiment, the color filter 14 includes a transparent first filtering part 1401 corresponding to the first sub-pixel 102, a green second filtering part 1402 corresponding to the second sub-pixel 103, and a blue third filtering part 1403 corresponding to the third sub-pixel 104. The red quantum dot particles 1430 are formed in the transparent first filtering part 1401. The green quantum dot particles 1432 are formed in the green second filtering part 1402. There is no quantum dot particle 143 in the blue third filtering part 1403. In the other embodiment, the color of the first filtering part 1401 corresponding to the first sub-pixel 402 can be red which is the same color of the light emitted from the first sub-pixel 402.

The red quantum dot particles 1430 formed in the transparent first filtering part 1401 can convert a blue part and a green part of the white backlight passing through the first sub-pixel 102 to the red light. The green quantum dot particles 1432 formed in the green second filtering part 1402 can convert a blue part of the white backlight passing through the second sub-pixel 103 to the green light. Thus, most of the white backlight can pass through the color filter 14 and be used to display an image. The light transmittance of the color filter 14 is improved.

Figure 4:
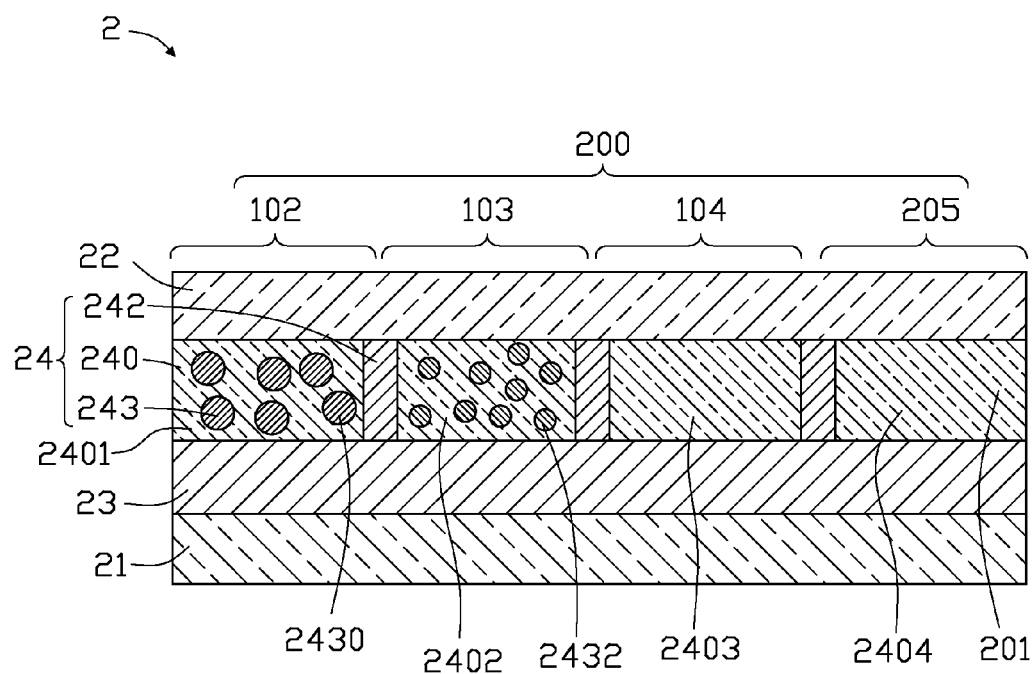
FIG. 4 is a cross-sectional view of a second embodiment of a display panel.

FIG. 4 illustrates a cross-sectional view of a second embodiment of a display panel 2. In this embodiment, the display panel 2 is an OLED display panel. The display panel 2 includes a first substrate 21, a second substrate 22 opposite to the first substrate 21, a lighting device 23, and a color filter 24.

The lighting device 23 is formed on the first substrate 21 and configured to emit a backlight. In this embodiment, the lighting device 23 is an OLED array substrate for emitting a white backlight.

The color filter 24 is formed on the second substrate 12. The color filter 24 defines a number of pixel areas 200. Each pixel area 200 includes a number of sub-pixels 201 for respectively converting the backlight to the light with different colors. The color filter 24 includes a number of filtering parts 240 with different colors, a black matrix 242, and a number of quantum dot particles 243 formed in the filtering parts 240. The filtering parts 240 with different colors are divided by the black matrix 242 and respectively correspond to the sub-pixels 201 for respectively converting the backlight to the light with different colors. The color filter 24 receives the backlight from the lighting device 23 and converts the backlight to light with different colors for displaying a full color image.

In this embodiment, each pixel area 200 defines a first sub-pixel 202, a second sub-pixel 203, a third sub-pixel 204, and a fourth sub-pixel 205. The first sub-pixel 202 emits a red light. The second sub-pixel 203 emits a green light. The third sub-pixel 204 emits a blue light. The fourth sub-pixel 205 emits a white light to increase a brightness of the pixel area 200. The color filter 24 includes a transparent first filtering part 2401 corresponding to the first sub-pixel 202, a green second filtering part 2402 corresponding to the second sub-pixel 203, a blue third filtering part 2403 corresponding to the third sub-pixel 204, a transparent fourth filtering part 2404 corresponding to the fourth sub-pixel 205, a number of red quantum dot particles 2430 formed in the transparent first filtering part 2401, and a number of green quantum dot particles 2432 formed in the green second filtering part 2402. There is no quantum dot particles 243 in the blue third filtering part 2403 and the transparent fourth filtering part 2404. The white backlight passes through the transparent fourth filtering part 2404 without any color conversion. In the other embodiment, the color of the first filtering part 2401 corresponding to the first sub-pixel 202 can be red which is the same color of the light emitted from the first sub-pixel 202.

Figure 5:
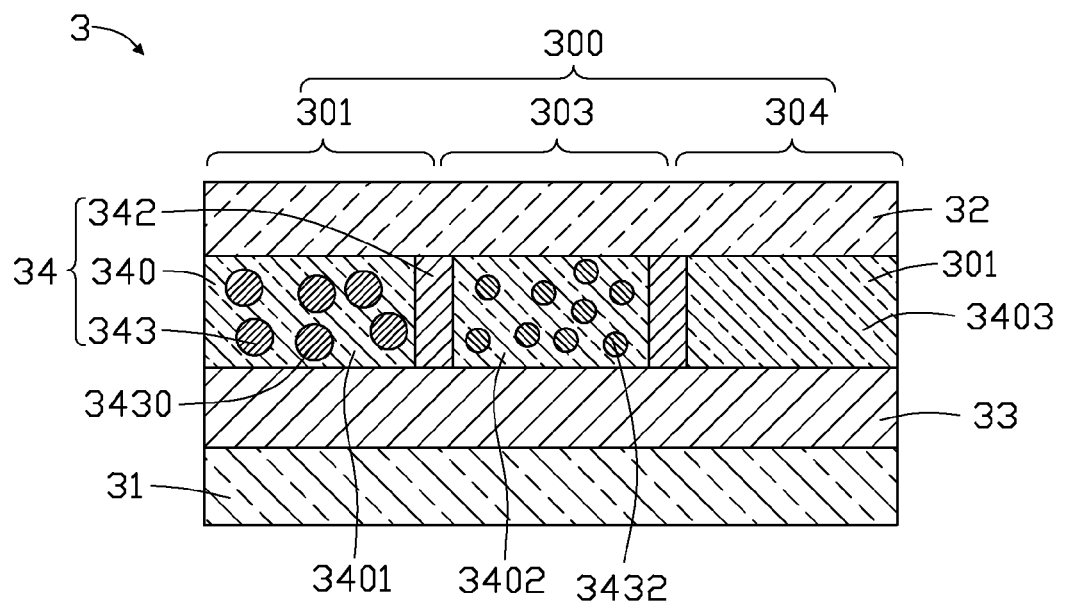
FIG. 5 is a cross-sectional view of a third embodiment of a display panel.

FIG. 5 illustrates a cross-sectional view of a third embodiment of a display panel 3. In this embodiment, the display panel 3 is an OLED display panel. The display panel 3 includes a first substrate 31, a second substrate 32 opposite to the first substrate 31, a lighting device 33, and a color filter 34.

The lighting device 33 is formed on the first substrate 31 and configured to emit a backlight. In this embodiment, the lighting device 33 is an OLED array substrate for emitting a blue backlight.

The color filter 34 is formed on the second substrate 32. The color filter 34 defines a number of pixel areas 300. Each pixel area 300 includes a number of sub-pixels 301 for respectively converting the backlight to the light with different colors. The color filter 34 includes a number of filtering parts 340 with different colors, a black matrix 342, and a number of quantum dot particles 343 formed in the filtering parts 340. The filtering parts 340 with different colors are divided by the black matrix 342 and respectively corresponding to the sub-pixels 301 for respectively converting the backlight to the light with different colors. The color filter 34 receives the backlight from the lighting device 33 and converts the backlight to light with different colors for displaying a full color image.

In this embodiment, each pixel area 300 defines a first sub-pixel 302, a second sub-pixel 303, and a third sub-pixel 304. The first sub-pixel 302 emits a red light. The second sub-pixel 303 emits a green light. The third sub-pixel 304 emits a blue light. The color filter 34 includes a transparent first filtering part 3401 corresponding to the first sub-pixel 302, a transparent second filtering part 3402 corresponding to the second sub-pixel 303, a transparent third filtering part 3403 corresponding to the third sub-pixel 304, a number of red quantum dot particles 3430 formed in the transparent first filtering part 3401, and a number of green quantum dot particles 3432 formed in the transparent second filtering part 3402. There are no quantum dot particles 343 in the transparent third filtering part 2403. In the other embodiment, the color of the first filtering part 3401 corresponding to the first sub-pixel 302 can be red which is the same color of the light emitting from the first sub-pixel 302. The color of the second filtering part 3402 corresponding to the second sub-pixel 303 can be green which is the same color of the light emitted from the second sub-pixel 303.

Figure 6:
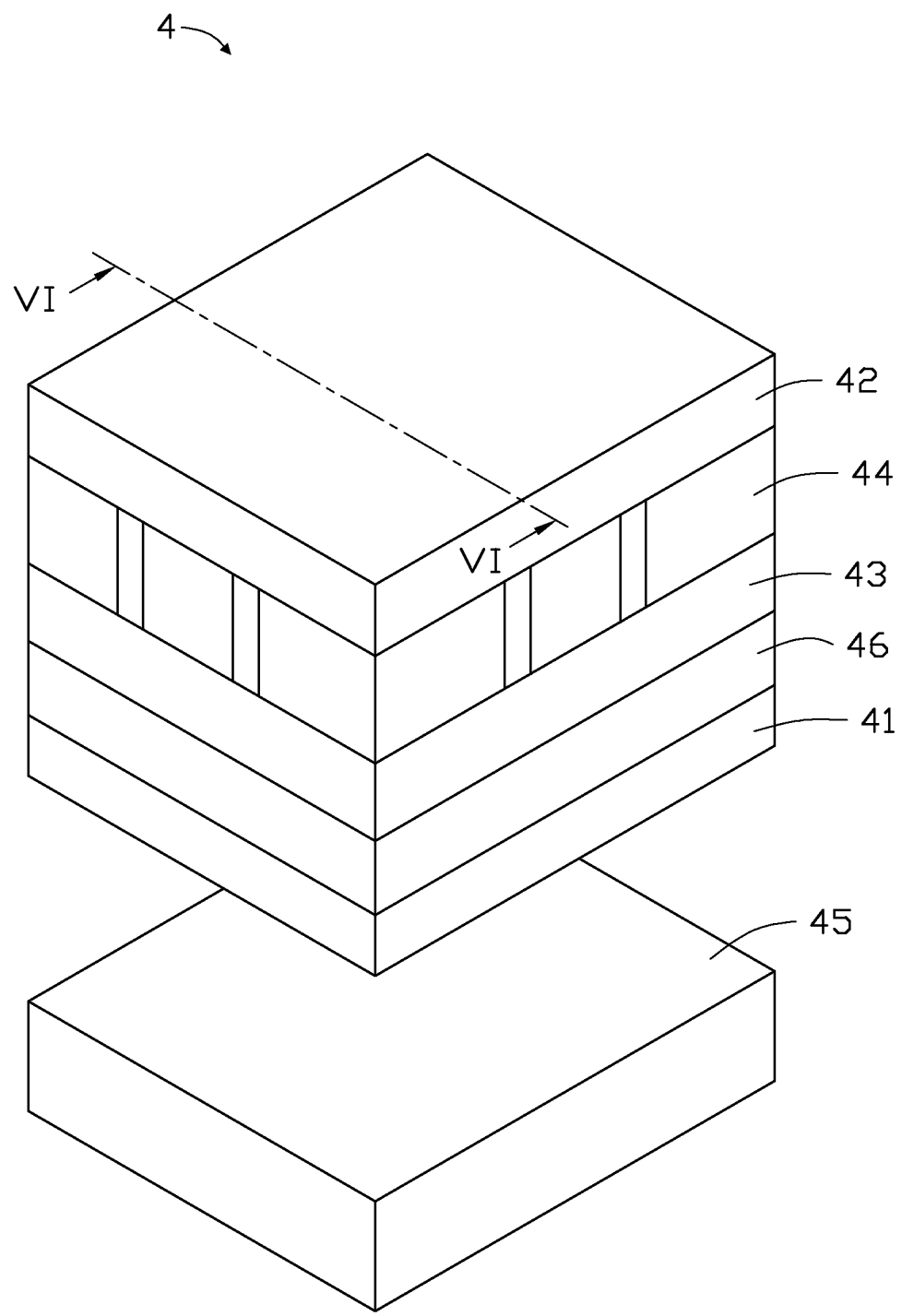
FIG. 6 is an isometric view of a fourth embodiment of a display panel.
Figure 7:
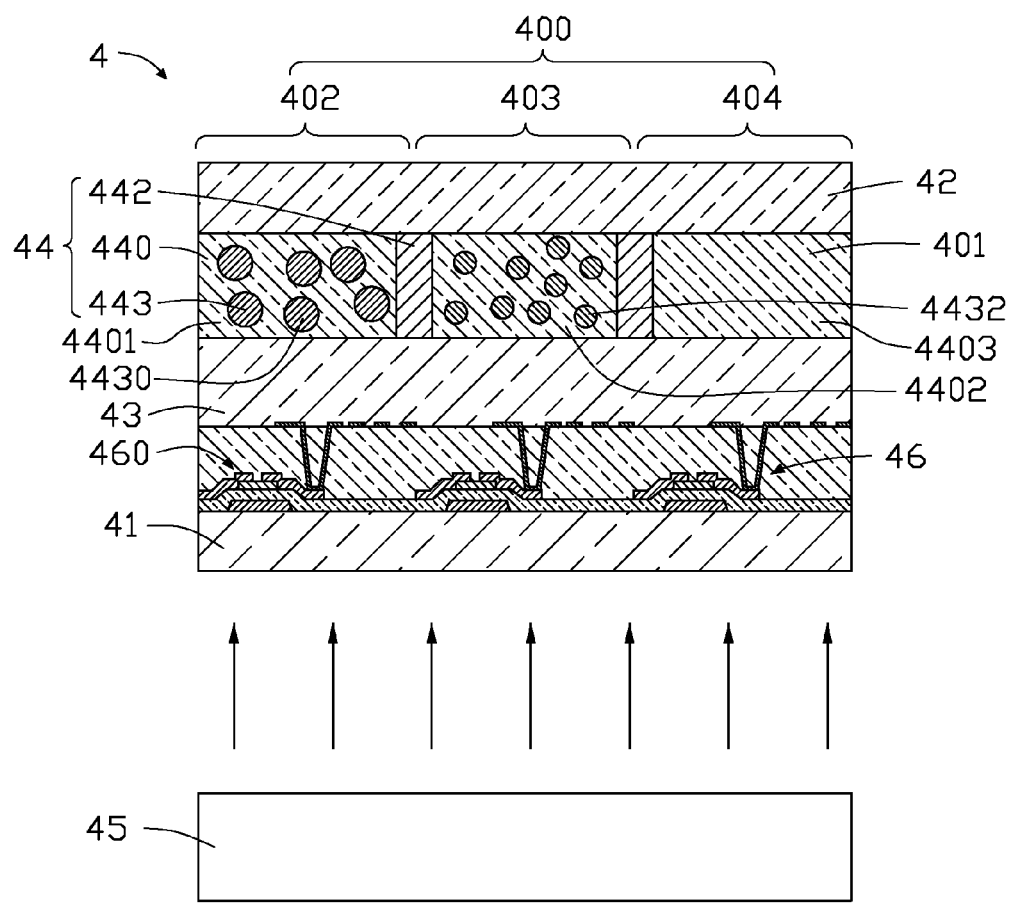
FIG. 7 is a cross-sectional view of the display panel of FIG. 5, taken along line VI-VI.

FIG. 6 illustrates an isometric view of a fourth embodiment of a display panel 4. FIG. 7 illustrates a cross-sectional view of the display panel 4 of FIG. 5, taken along line VI-VI. FIG. 7 illustrates one pixel area 400 for example. The display panel 4 displays a full color image. In this embodiment, the display panel 4 is a LCD panel.

The display panel 4 includes a first substrate 41, a second substrate 42 opposite to the first substrate 41, a liquid crystal layer 43 set between the first substrate 41 and the second substrate 43, a color filter 44 is formed on the second substrate 43, and a backlight module 45 set below the first substrate 41 for emitting a backlight. The first substrate 41 is an array substrate with a thin film transistor (TFT) array 46.

The color filter 44 defines a number of pixel areas 400. Each pixel area 400 includes a number of sub-pixels 401 for respectively converting the backlight to the light with different colors. Each TFT 460 of the TFT array 46 corresponding to one of the sub-pixels 401 controls a rotation of the liquid crystal molecules of the liquid crystal layer 43 in the sub-pixel 401 to adjust a light transmittance of the sub-pixel 401. In this embodiment, the display panel 4 employs three-primary color lights to display the full color image. The sub-pixels 401 can be a first sub-pixel 402, a second sub-pixel 403, and a third sub-pixel 404. The first sub-pixel 402 emits a red light. The second sub-pixel 403 emits a green light. The third sub-pixel 404 emits a blue light. The backlight 45 emits a white backlight.

The color filter 44 includes a number of filtering parts 440 with different colors, a black matrix 442, and a number of quantum dot particles 443 formed in the filtering parts 440. The filtering parts 440 with different colors are divided by the black matrix 442 and respectively corresponding to the sub-pixels 401 for respectively converting the backlight to the light with different colors.

In this embodiment, the color filter 44 includes a transparent first filtering part 4401 corresponding to the first sub-pixel 402, a green second filtering part 4402 corresponding to the second sub-pixel 403, a blue third filtering part 4403 corresponding to the third sub-pixel 404, a number of red quantum dot particles 4430 formed in the transparent first filtering part 4401, and a number of green quantum dot particles 4432 formed in the green second filtering part 4402. There is no quantum dot particle 443 in the blue third filtering part 4403.

Figure 8:
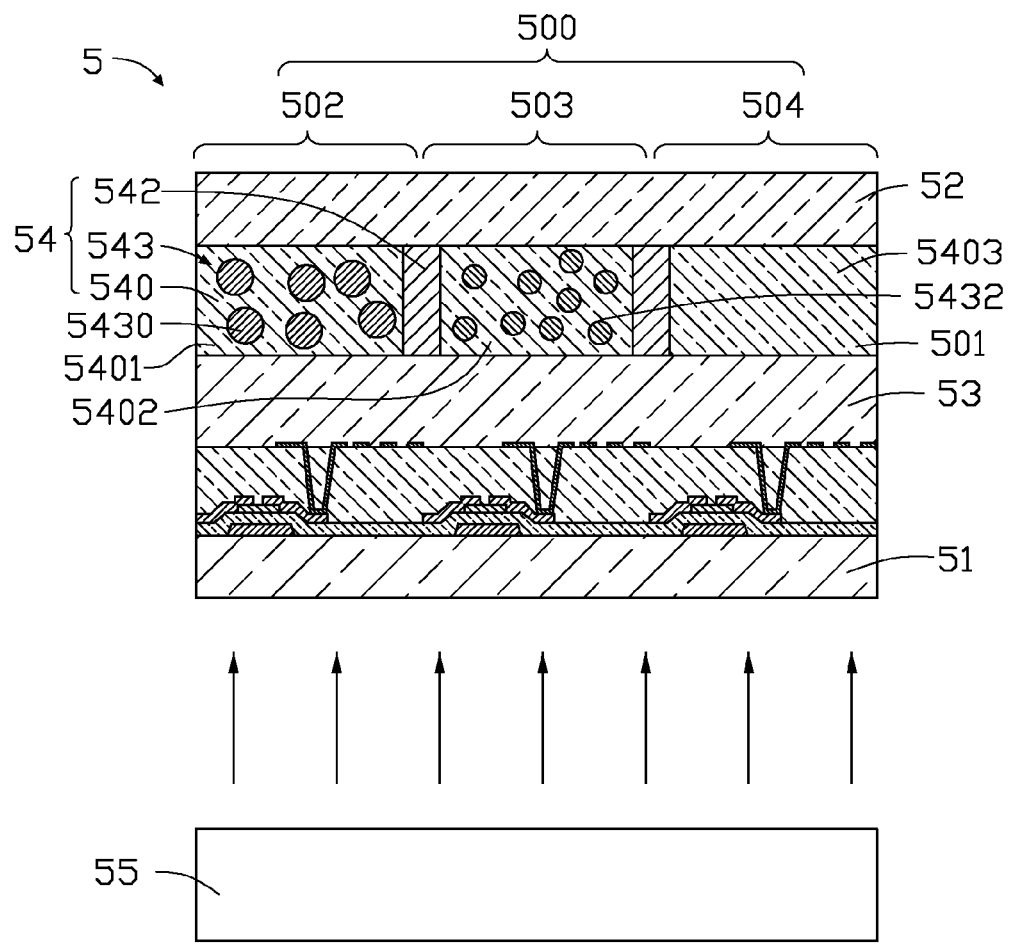
FIG. 8 is a cross-sectional view of a fifth embodiment of a display panel.

FIG. 8 illustrates a cross-sectional view of a fifth embodiment of a display panel 5. In this embodiment, the display panel 5 is a LCD panel. The display panel 5 includes a first substrate 51, a second substrate 52 opposite to the first substrate 51, a liquid crystal layer 53 set between the first substrate 51 and the second substrate 53, a color filter 54 formed on the second substrate 53, and a backlight module 55 set below the first substrate 51 for emitting a backlight.

The color filter 54 defines a number of pixel areas 500. Each pixel area 500 includes a number of sub-pixels 501 for respectively converting the backlight to the light with different colors. In this embodiment, the display panel 5 employs three-primary color lights to display the full color image. The sub-pixels 501 can be a first sub-pixel 502, a second sub-pixel 503, and a third sub-pixel 504. The first sub-pixel 502 emits a red light. The second sub-pixel 503 emits a green light. The third sub-pixel 504 emits a blue light. The backlight 55 emits a blue backlight.

The color filter 54 includes a number of filtering parts 540 with different colors, a black matrix 542, and a number of quantum dot particles 543 formed in the filtering parts 540. The filtering parts 540 with different colors are divided by the black matrix 542 and respectively correspond to the sub-pixels 501 respectively converting the backlight to the light with different colors.

In this embodiment, the color filter 54 includes a transparent first filtering part 5401 corresponding to the first sub-pixel 502, a transparent second filtering part 5402 corresponding to the second sub-pixel 503, a transparent third filtering part 5403 corresponding to the third sub-pixel 504, a number of red quantum dot particles 5430 formed in the transparent first filtering part 5401, and a number of green quantum dot particles 5432 formed in the transparent second filtering part 5402. There is no quantum dot particle 543 in the transparent third filtering part 5403.

Figure 9:
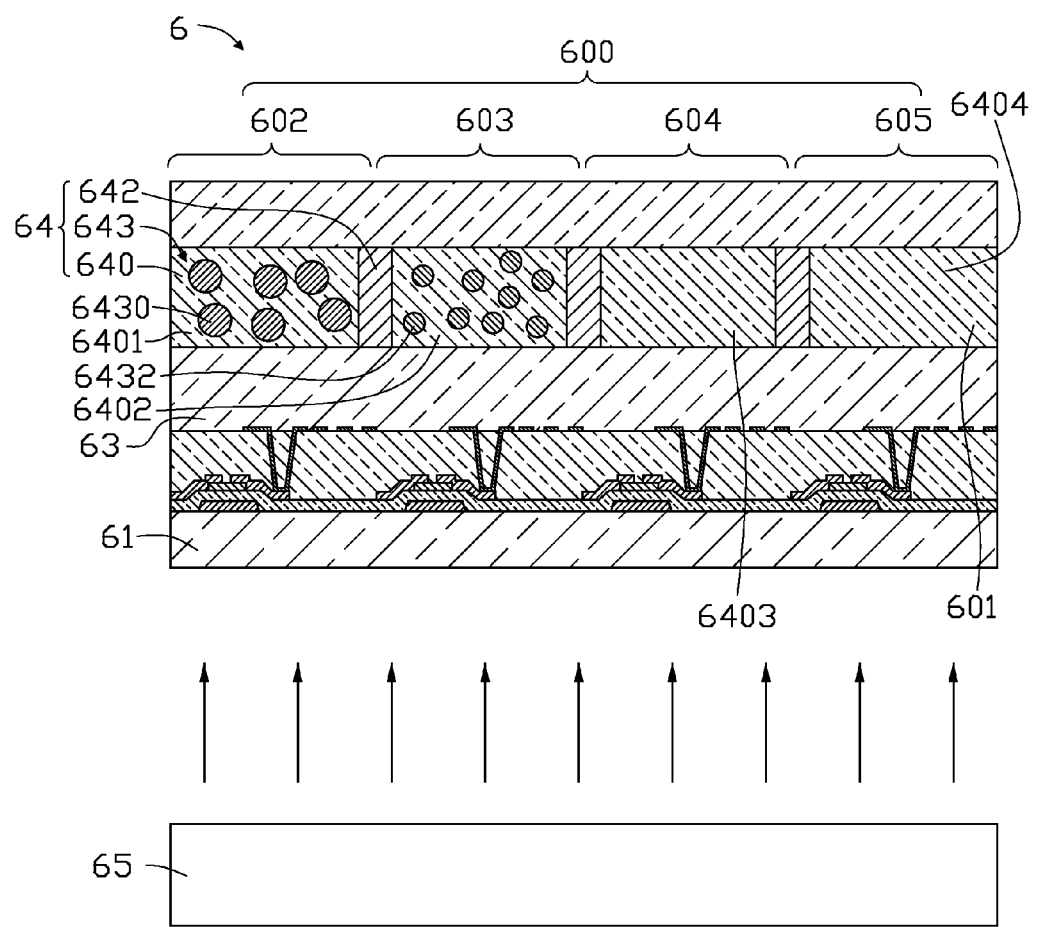
FIG. 9 is a cross-sectional view of a sixth embodiment of a display panel.

FIG. 9 illustrates a cross-sectional view of a sixth embodiment of a display panel 6. In this embodiment, the display panel 6 is a LCD panel. The display panel 6 includes a first substrate 61, a second substrate 62 opposite to the first substrate 61, a liquid crystal layer 63 set between the first substrate 61 and the second substrate 63, a color filter 64 formed on the first substrate 61, and a backlight module 65 set below the first substrate 61 for emitting a backlight.

The color filter 64 defines a number of pixel areas 600. Each pixel area 600 includes a number of sub-pixels 601 for respectively converting the backlight to the light with different colors. In this embodiment, the display panel 6 employs three-primary colors light to display the full color image. The sub-pixels 601 can be a first sub-pixel 602, a second sub-pixel 603, a third sub-pixel 604, and a fourth sub-pixel 605. The first sub-pixel 602 emits a red light. The second sub-pixel 603 emits a green light. The third sub-pixel 604 emits a blue light. The fourth sub-pixel 605 emits a white light to increase a brightness of the pixel area 600. The backlight 65 emits a white backlight.

The color filter 64 includes a number of filtering parts 640 with different colors, a black matrix 642, and a number of quantum dot particles 643 formed in the filtering parts 640. The filtering parts 640 with different colors are divided by the black matrix 642 and respectively correspond to the sub-pixels 601 for respectively converting the backlight to the light with different colors.

In this embodiment, the color filter 64 includes a transparent first filtering part 6401 corresponding to the first sub-pixel 602, a green second filtering part 6402 corresponding to the second sub-pixel 603, a blue third filtering part 6403 corresponding to the third sub-pixel 604, a transparent fourth filtering part 6404 corresponding to the fourth sub-pixel 605, a number of red quantum dot particles 6430 formed in the transparent first filtering part 6401, and a number of green quantum dot particles 6432 formed in the green second filtering part 6402. There is no quantum dot particle 643 in the blue third filtering part 6403 and the transparent fourth filtering part 6404. The white backlight passes through the transparent fourth filtering part 6404 without any color conversion.

It is believed that the present embodiments and their advantages will be understood from the foregoing description, and it will be apparent that various changes may be made thereto without departing from the scope of the disclosure or sacrificing all of its material advantages.

What is claimed is:

1. A display panel comprising:
   a lighting device emitting a white light; and
   a color filter layer converting the white light to light with three-primary colors;
   wherein the color filter layer comprises a first filtering part, a second filtering part, and a third filtering part; a plurality of first quantum dot particles is formed in the first filtering part, a plurality of second quantum dot particles is formed in the second filtering part, and no quantum dots particle is formed in the third filtering part; the first filtering part only allows green light to pass through, the second filtering part only allows red light to pass through, the third filtering part only allows blue light to pass through;
   wherein the first filtering part comprises photoresist material; the plurality of first quantum dot particles is dispersed in the photoresist material; and
   wherein a density of the first quantum dot particles dispersed in the photoresist material near the lighting device is greater than a density of the first quantum dot particles dispersed in the photoresist material away from the lighting device.

2. The display panel of claim 1, wherein the first quantum dot particles are capable of converting light having a wavelength less than a wavelength of green light to green light; the second quantum dot particles are capable of converting light having a wavelength less than a wavelength of red light to red light.

3. The display panel of claim 1, wherein the color filter further comprises a fourth filtering part, the fourth filtering part is transparent and comprises no quantum dot particles formed therein, the fourth filtering part only allows white light to pass through.

4. The display panel of claim 1, wherein the lighting device is an organic light emitting diode array substrate.

5. A display panel comprising:

a lighting device emitting a blue backlight; and a color filter converting the blue backlight to light with three-primary colors;

wherein the color filter layer comprises a first filtering part, a second filtering part, and a third filtering part; a plurality of first quantum dot particles is formed in the first filtering part, a plurality of second quantum dot particles is formed in the second filtering part, and no quantum dots particle is formed in the third filtering part; the first filtering part only allows green light to pass through, the second filtering part only allows red light to pass through, the third filtering part only allows blue light to pass through;

wherein the first filtering part comprises photoresist material; the plurality of first quantum dot particles is dispersed in the photoresist material; and wherein a density of the first quantum dot particles dispersed in the photoresist material near the lighting device is greater than a density of the first quantum dot particles dispersed in the photoresist material away from the lighting device.

6. The display panel of claim 5, wherein the first quantum dot particles are capable of converting light having a wavelength less than a wavelength of green light to green light; the second quantum dot particles are capable of converting light having a wavelength less than a wavelength of red light to red light.

* * * * *